(12) United States Patent
Abel (10) Patent No.: US 9,416,894 B2
(45) Date of Patent: Aug. 16, 2016

(54) LOCKING MECHANISM WITH VISIBLE STATUS INDICATION

(71) Applicant: Leo William Abel, Houston, TX (US)

(72) Inventor: Leo William Abel, Houston, TX (US)

( * ) Notice: Subject to any disclaimer, the term of this patent is extended or adjusted under 35 U.S.C. 154(b) by 126 days.

(21) Appl. No.: 14/314,953

(22) Filed: Jun. 25, 2014

(65) Prior Publication Data

US 2015/0377382 A1    Dec. 31, 2015

(51) Int. Cl.
*F16K 35/00*    (2006.01)

(52) U.S. Cl.
CPC .............. *F16K 35/00* (2013.01); *Y10T 137/71* (2015.04); *Y10T 137/8175* (2015.04); *Y10T 137/8225* (2015.04)

(58) Field of Classification Search
CPC . F16K 35/00; Y10T 137/71; Y10T 137/8175; Y10T 137/8225
USPC ............... 137/383, 384, 551–559; 92/15
See application file for complete search history.

(56) References Cited

U.S. PATENT DOCUMENTS

| | | | | |
|---|---|---|---|---|
| 3,286,978 A * | 11/1966 | Lansky | ............... | F16K 35/00 251/112 |
| 3,552,432 A * | 1/1971 | Wagner | ............... | B65D 49/08 137/384.2 |
| 3,589,397 A * | 6/1971 | Wagner | ............... | F16K 1/305 137/384.2 |
| 3,885,451 A | 5/1975 | Hamon | | |
| 3,985,332 A * | 10/1976 | Walker | ............... | F16K 1/302 222/147 |
| 4,253,690 A * | 3/1981 | Hollander | ............... | F16K 35/00 292/354 |
| 4,406,303 A * | 9/1983 | Kilmoyer | ............ | F16K 37/0008 137/552 |
| 4,671,540 A * | 6/1987 | Medvick | ............... | F16L 37/133 137/614.03 |
| 4,946,130 A * | 8/1990 | Kooiman | ............... | F16K 31/56 251/100 |
| 5,553,982 A | 9/1996 | Hashikawa | | |
| 6,289,918 B1 * | 9/2001 | Rief | ............... | F16K 35/00 137/114 |
| 6,684,670 B1 * | 2/2004 | Agbay | ............... | E05B 67/365 70/14 |
| 7,494,158 B2 * | 2/2009 | Weh | ............... | F16L 37/121 137/614.03 |
| 8,480,340 B2 | 7/2013 | Riestra | | |
| 2009/0266228 A1 | 10/2009 | Teschke et al. | | |
| 2012/0248350 A1 * | 10/2012 | Sakata | ............... | H01M 8/2465 251/116 |
| 2014/0332703 A1 * | 11/2014 | Paradise | ............... | F16K 35/00 251/89 |

FOREIGN PATENT DOCUMENTS

WO    03042550 A1    5/2003

* cited by examiner

*Primary Examiner* — Michael R Reid
*Assistant Examiner* — Christopher Ballman
(74) *Attorney, Agent, or Firm* — Buskop Law Group, PC; Wendy Buskop (57) ABSTRACT

A system for verifiably locking a first cylindrical component to a second cylindrical component in a safe and secure manner. The system provides a visible indication when the first component and second component are fully and effectively secured. The first cylindrical component comprises a lock cylinder fixedly attached to the first cylindrical component. The lock cylinder comprises a lock piston. The second cylindrical component comprises a channel with a guide region and a lock region. The visible portion of the lock piston provides an indication of whether or not the lock piston is secured in the lock region of the channel. The system is also capable of being operated from a control panel to operate the locks, receive signals from sensors, and to display the lock status of the system. The system offers redundant verifications to enhance safety in operating environments.

15 Claims, 8 Drawing Sheets

LOCKING MECHANISM WITH VISIBLE STATUS INDICATION

FIELD

The present embodiments generally relate to a locking mechanism with a visible status indication.

BACKGROUND

A need exists for an effective and secure mechanism for connecting various components together which provides an easily discernible visual indication of status.

A further need exists for simplifying and speeding the process for connecting various components together while concurrently ensuring a full and secure connection.

These needs are amplified in industrial environments where many connections are critical to safe operation of equipment and the failure of a connection can result in costly equipment damage, downtime of operations, severe injuries or death to personnel.

In chemical processing or oil and gas operating environments, there are often cylindrical components or components with cylindrical connectors that need to be attached or locked together. Examples include, but are not limited to, blowout preventers, piping, valves, sensors, pressure relief equipment, and the like.

Often these pieces of equipment function under harsh conditions such as extremely high pressures and temperatures. Failure of connections between components serving critical functions, especially in harsh environments, could have undesirable, catastrophic, and life threating consequences.

In the current state of the art, many of these connections are threaded connections requiring operators to make a specific number of turns to properly connect or lock pieces of equipment together. Further, there is no facility once components have been attached to verify that the connection has been accomplished in the proper manner.

Also in the current state of the art, many connections make use of lugs or pins that absorb the stresses due to pressure, temperature, weight, and the like that the connections are subjected to. While lugs and pins are an effective means of connecting components, current connections lack a simple and effective locking means that provide either a visual, electronic, or hydraulic indication of secure engagement.

Connections between equipment could be made improperly by a careless or inexperienced operator, creating a potentially hazardous situation with no way to easily verify the status of the connection.

The present invention meets these needs with a simple and easy to implement locking system, wherein the locking status can be visually verified onsite where the device is located as well as monitored in a control room. The present invention further simplifies the procedure for connection by eliminating the need for threaded connections, and implementing a simple to use, and intuitive system for locking components together that requires little to no training for proper use.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to a system for verifiably locking a first cylindrical component to a second cylindrical component, wherein the system provides a visible indication to provide the ability to verify when the first cylindrical component and the second cylindrical component are secured. The system can prevent the first cylindrical component and the second cylindrical component for moving with respect to each other in all directions, including rotationally.

The system has the benefit of being extremely simple to implement, requiring little to no training of operators. The system is intuitive and designed in a manner to discourage or prevent improper and potentially unsafe connections between equipment.

As a further benefit, the system provides an easily discernible visual indication of the connection status. Operators or field personnel can quickly verify security of a connection, thus improving reliability, avoiding potentially life threating situations, reducing costs due to catastrophic failures or shutdowns, and greatly improving safety.

The system can be implemented on equipment subject to a range of temperatures, pressures, mechanical stresses, gravitational forces, or otherwise harsh conditions. By creating and utilizing an adapter, current pieces of equipment already in the field can be readily and inexpensively modified to utilize this system.

The system can be implemented in oilfields, refineries, chemical processing plants, steel mills, power plants, onshore or offshore drilling rigs, or any location with heavy or industrial equipment requiring a secure connection.

The descriptions below will often utilize pipe connections to exemplify the invention. However, non-cylindrical equipment needing to be connected could utilize the present system by incorporating cylindrical connection points.

The system can have a first cylindrical component with a lock cylinder comprising a lock body fixedly attached. The first cylindrical component can be a piece of equipment such as a pipe, a blowout preventer, a blowout preventer adaptor, a valve, or any piece of equipment needing to be securely attached, connected, or locked to another component.

In embodiments, the lock cylinder can have a sealing means to prevent the entry of foreign objects, debris, liquids, moisture, or any combination thereof. In addition, sealing means may be capable of operating in high pressure environments. In embodiments, the sealing means can withstand pressures of up to 5000 pounds per square inch.

In embodiments, the sealing means can incorporate O-rings (as well as variations such as x-rings, q-rings, etc.), retaining balls, washers, gaskets, packing, epoxies, barrier coatings, and the like. Persons having ordinary skill in the art can choose appropriate sealing means based upon the application of the system and the environment the system will be required to operate in.

Appropriate materials for the lock cylinder, the lock cylinder constituents, and sealing means can be selected based upon the implemented application.

The lock body can house a movable lock piston. The lock piston can have a visible portion and a locking portion. The lock body can be configured to allow the visible portion, the locking portion, or both the visible and locking portion to extend at least partially out of the lock body. The visible portion can be colored or shaped to enhance its noticeability. For example, the visual portion may be painted bright red, sized to have a larger section to be seen, or other features to attract attention.

The lock piston, as will become further evident below, cooperates with system constituents on a second cylindrical component to securely lock the first and second cylindrical components in place.

In embodiments, the visible portion of the lock piston can extend from the lock body when the locking portion is not properly secured to lock the first and second cylindrical components together. Conversely, the visible portion of the lock piston can be completely contained within the lock body when the locking portion is properly secured.

The lock body can have a means of positioning the lock piston to selectively extend out of the lock body. The means can comprise one or more components such as an elastic material, a biasing means, a fluid added to the lock body, a fluid drained from the lock body, a positioning thread disposed within the lock body engaging a piston thread on the lock piston, and the like. Fluid can refer to liquids for hydraulic systems, as well as gasses used in pneumatic systems.

For example, the visible portion and the locking portion can be extended from the lock body by selectively using a hydraulic or a pneumatic system. The positioning means can be automated and operated by a control system, manually operated, or combinations thereof. For example, in embodiments, a biasing means such as a spring in conjunction with a bias retainer securing the spring can be used to extend the locking portion from the lock body. A hydraulic or pneumatic system can be used to counteract the biasing means and extend the visible portion from the lock body.

In embodiments of the system using hydraulic or pneumatic means to position the lock piston, the lock body can also have a port for fluid flow in communication with a fluid supply, and a sealed area to contain fluid. The lock piston can further comprise at least one piston shoulder to allow the fluid to act on, and position the lock piston.

In embodiments, a further manual means of positioning the cylinder can be incorporated for positioning the lock piston. The manual means can be a backup means in the event of hydraulic or pneumatic system failure, or a standalone means of positioning the lock piston. In these embodiments, a positioning thread can disposed within the lock body for engaging a piston thread disposed on the lock piston. A portion of the lock body, the lock piston, or combinations thereof can be rotated to adjust the position of the lock piston.

The system can have a second cylindrical component comprising a channel. The channel can have a guide region and a lock region contiguous with each other.

The guide region of the channel can be sized to receive the locking portion of the lock piston in a substantially snug manner to facilitate proper orientation and alignment of the first cylindrical component and the second cylindrical component. The guide region can also be shaped to guide the first cylindrical component and the second cylindrical component together for a proper connection as the locking piston travels through the guide region.

In embodiments, the guide region can have a depth that forces the visible portion of the lock piston to extend from the lock body in a manner that is evident to a user of the system. In these embodiments, both the visible portion, and the locking portion will be partially extended from the lock body.

The lock region of the channel can be sized to receive the locking portion of the lock piston and secure it in a substantially immobile fashion, thus locking the first cylindrical component and the second cylindrical component together.

The lock region, in embodiments, can have a depth allow the visible portion of the lock piston to be completely contained within the lock body, such that there is no evident extension of the visible portion from the lock body. The lock region, in embodiments, can also comprise a first mechanical feature disposed proximate the guide region to demarcate the two regions. The mechanical feature can be a protrusion, a step, an incline leading to a flat stop, or the like.

The first mechanical feature can mechanically cooperate with at least a portion of the locking portion to help secure the lock piston in a substantially immobile fashion, thus locking the first cylindrical component and the second cylindrical component together.

Complementary features to the first mechanical feature can be incorporated on the locking portion of the lock piston. For example, the lock piston can have an angled face opposite a substantially flat face. The angled face can aid travel across the mechanical feature when moving from the guide region to the lock region, while the flat face can mechanically cooperate with the first mechanical feature when within the lock region to secure the lock piston in a substantially immobile fashion, thus locking the first cylindrical component and the second cylindrical component together.

In embodiments, the visible portion of the lock piston, when extended from the lock body, provides an indication that the lock piston is not properly secured in the lock region of the channel. The first mechanical feature can function to exaggerate the amount that the visible portion of the lock piston extends from the lock body.

Additional indications can also be used with the system. For example, a sensor can be used to detect the position of the lock piston and provide a signal of the lock status to a control panel, distributed control system, supervisory control and data acquisition system (SCADA), human machine interface (HMI), alarm management system, and the like. In this manner, a user in the field can have a visible indication of lock status, while an operator viewing a controls display can concurrently have an electronic, hydraulic, visual, graphical, audible, alarm, or other similar indication of lock status.

The system can incorporate a redundant indication, such as a position indicator. The position indicator can be fixedly attached to the first cylindrical component. The position indicator can have an indicator body with a first end and a second end. A movable indicator piston can be disposed within the indicator body, and configured to extend at least partially out of the indicator body.

The indicator piston can be biased to extend out of the second end. A second mechanical feature can be disposed within the channel, wherein the second mechanical feature overcomes the bias acting on the indicator piston when aligned with the indicator piston. When the indicator piston and the second mechanical feature are aligned, the indicator piston can visibly extend out of the first end of the indicator body. The indicator piston and the second mechanical feature align only when the first cylindrical component and the second cylindrical component are secured together.

In this embodiment, the visible portion of the lock piston can be hidden from view within the lock body while the indicator piston extends visibly from the indicator body when the first cylindrical component and the second cylindrical component are locked together. In this manner, user can have a confirming dual indication when a position indicator is used in conjunction with the lock body.

Biasing means and sensors can be incorporated into the position indicator in much the same manner as disclosed for the lock body.

The second mechanical feature can be integral to, contiguous with, or simply a portion of the first mechanical feature. The second mechanical feature need only be positioned within the channel for proper alignment with the position indicator when the first cylindrical component and the second cylindrical component are locked together.

Figure 1A:
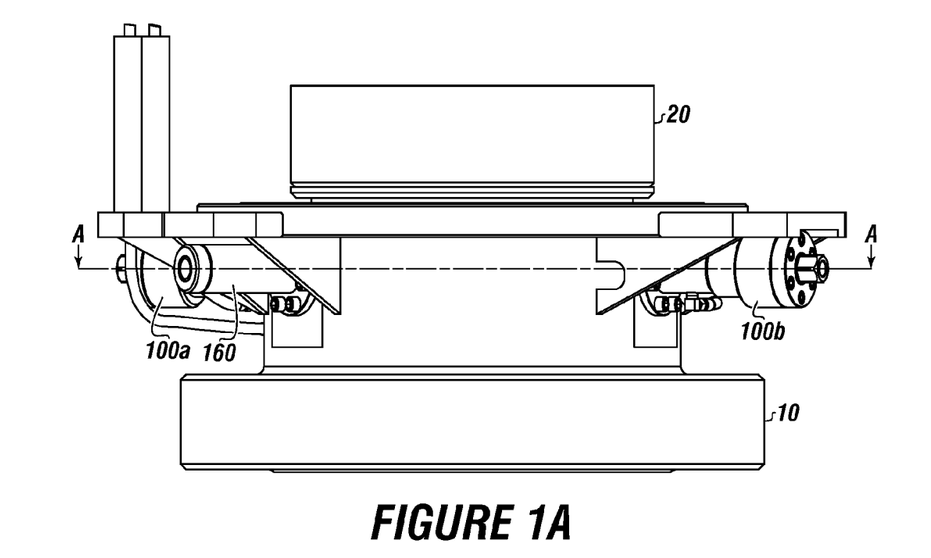
FIG. 1A is a side view of an embodiment of a system for verifiably locking a first cylindrical component to a second cylindrical component.

Turning now to the figures, FIG. 1A is a side view of an embodiment of a system for verifiably locking a first cylindrical component to a second cylindrical component.

The first cylindrical component 10 is shown unlocked to the second cylindrical component 20. A plurality of lock cylinders 100a and 100b can be fixedly attached to the first cylindrical component. A position indicator 160 can also be fixedly attached to the first cylindrical component.

Figure 1B:
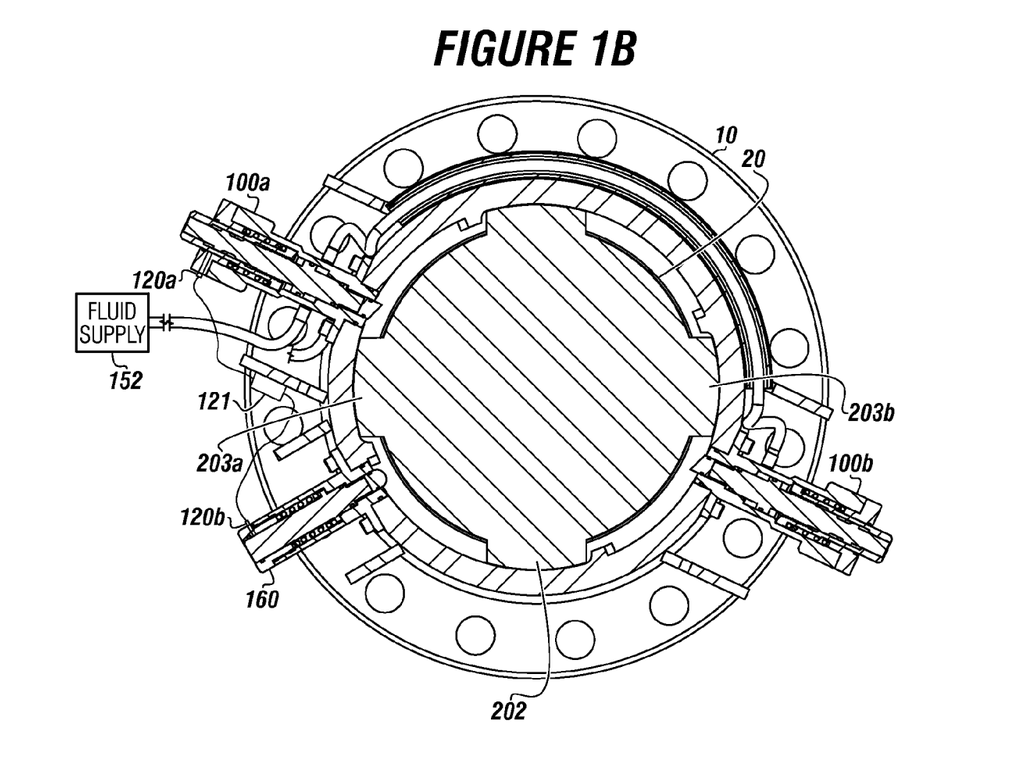
FIG. 1B is a cut view of an embodiment of the system in an unlocked position.

FIG. 1B is a cut view of an embodiment of the system in an unlocked position along cut line A-A.

The system can include a plurality of lock cylinders 100a and 100b fixedly attached to the first cylindrical component 10. In embodiments, the lock cylinder 100a can include a sensor 120a for determining the position of the lock piston. The sensor 120a can be connected to a means of communication to control system 121.

In embodiments, the system can include a position indicator 160 fixedly attached to the first cylindrical component 10. The position indicator can include a sensor 120b for determining the position of the indicator piston. The sensor 120b can be connected to the means of communication to control system 121.

The system can include a second cylindrical component 20. The second cylindrical component can comprise a plurality of first mechanical features 203a and 203b and a second mechanical feature 202.

In embodiments of the system using a hydraulic or pneumatic means to position the lock piston, the lock body can have a port for fluid flow in communication with a fluid supply 152.

Figure 1C:
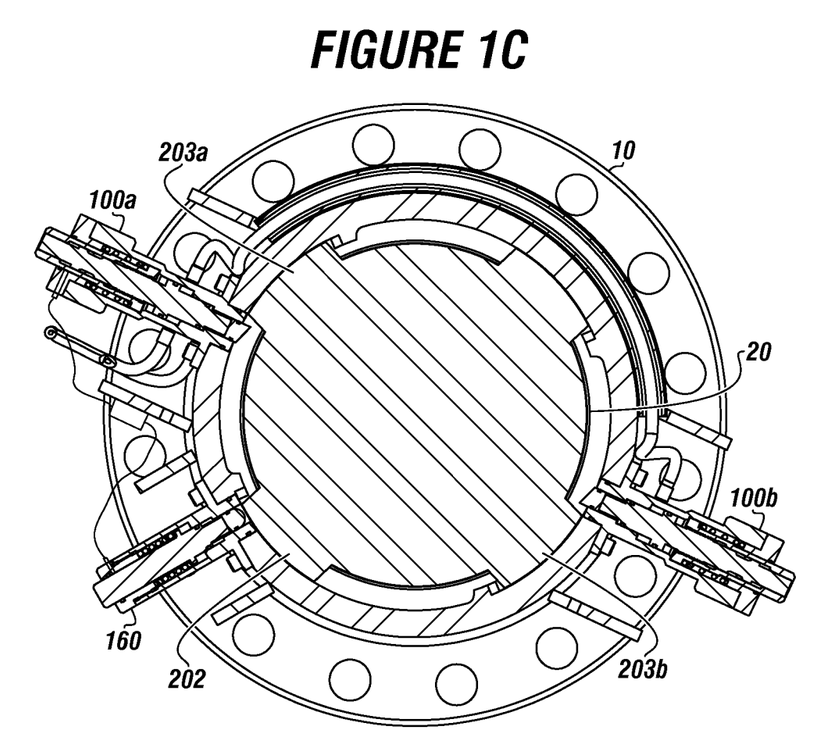
FIG. 1C is a cut view of an embodiment of the system in a locked position.

FIG. 1C is a cut view of an embodiment of the system in a locked position.

The first cylindrical component 10 and second cylindrical component 20 are shown. The first mechanical features 203a and 203b are shown in a locked position with lock cylinders 100a and 100b. The second mechanical feature 202 is shown in a locked position with the position indicator 160.

Figure 2A:
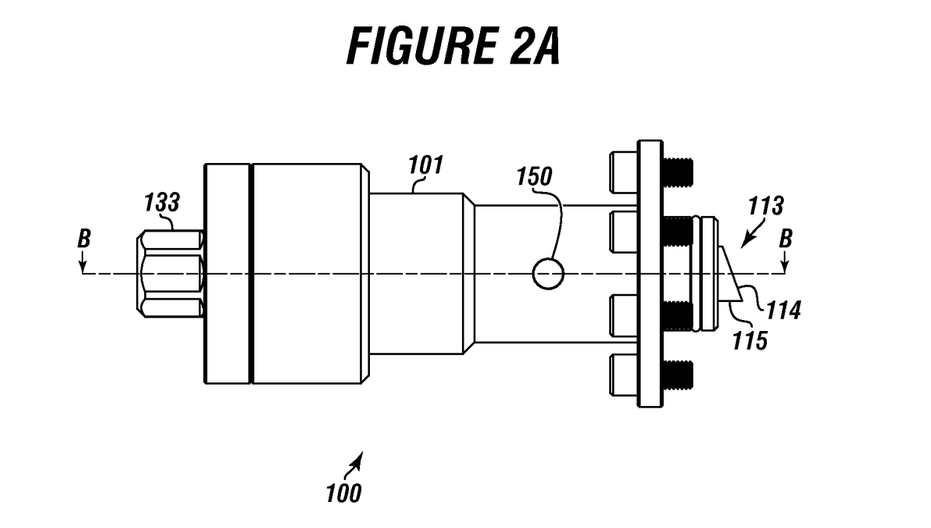
FIG. 2A is a side view of a lock cylinder in a locked position.

FIG. 2A is a side view of a lock cylinder in a locked position.

The lock cylinder 100 can comprise a lock body 101. In embodiments, the lock body 101 can have a port 150 for fluid flow in communication with the fluid supply.

The lock cylinder 100 can comprise a locking portion 113. The locking portion 113 can comprise an angled face 114 opposite a substantially flat face 115. The angled face 114 can displace the lock piston as it travels past the first mechanical feature and the substantially flat face 115 can cooperate with the first mechanical feature to secure the lock piston in the lock region.

The lock cylinder 100 can also include a rotatable portion 133.

Figure 2B:
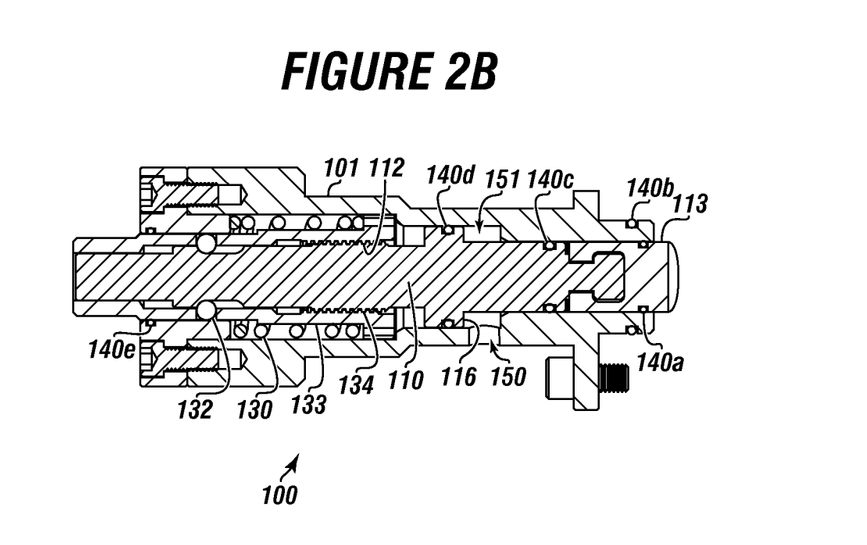
FIG. 2B is a cut view of a lock cylinder in a locked position.

FIG. 2B is a cut view of a lock cylinder in a locked position along cut line B-B.

The lock cylinder 100 can include a lock piston 110 disposed within the lock body 101. The lock piston can be movable. The lock piston 110 can comprise a locking portion 113, which can be selectively extended at least partially out of the lock body. The lock piston 110 can also comprise a piston thread 112 and a piston shoulder 116.

The lock cylinder 100 can include a means of positioning the lock piston. The means of positioning the lock piston can include a biasing means 130 and a bias retainer 132 to secure the biasing means. The biasing means 130 can apply force to the lock piston 110 to extend the lock piston at least partially out of the lock body in a first position. In embodiments, the biasing means can be a spring, a hydraulic means, a manual means, and the like.

The lock cylinder 100 can include a rotatable portion 133. The rotatable portion can comprise a positioning thread 134 disposed within the lock body 101. The positioning thread 134 can engage the piston thread 112.

The lock cylinder 100 can include a sealed area 151 for containing fluid. The sealed area 151 can be in fluid communication with the port 150 and the piston shoulder 116. The port 150 can allow fluid to flow into the lock body, out of the lock body, or both.

The lock body can comprise a plurality of sealing means 140a-140e to prevent entry of foreign objects, debris, liquids, moisture, or combinations thereof. In embodiments, the sealing means, or portions thereof can withstand a differential pressure of 5000 pounds per square inch (psi).

Figure 3A:
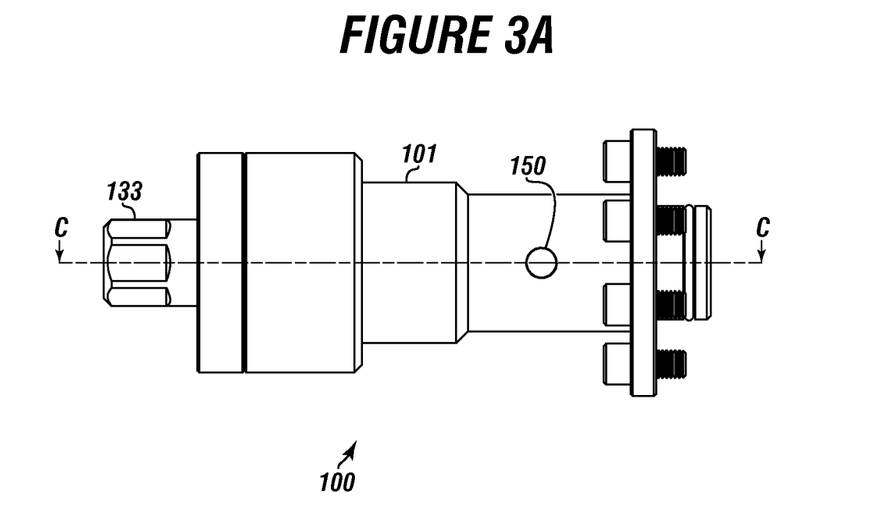
FIG. 3A is a side view of a lock cylinder in a hydraulically unlocked position.

FIG. 3A is a side view of a lock cylinder in a hydraulically unlocked position.

The lock cylinder 100 can include a lock body 101 with a port 150. The rotatable portion 133 is also shown. In embodiments, the rotatable portion 133 can comprise a nut for allowing a wrench or other tool to grip and apply torque.

Figure 3B:
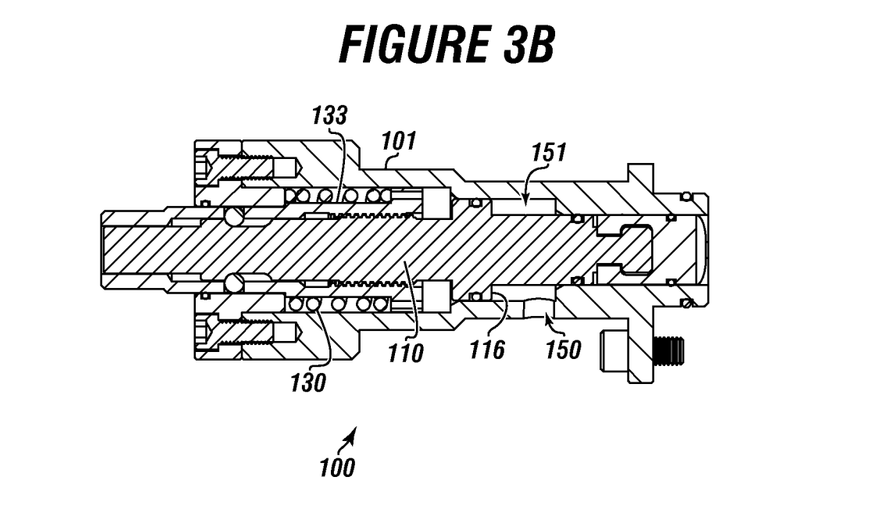
FIG. 3B is a cut view of a lock cylinder in a hydraulically unlocked position.

FIG. 3B is a cut view of a lock cylinder in a hydraulically unlocked position along cut line C-C.

The lock cylinder 100 can include a lock body 101 with a port 150. Fluid can flow into the sealed area 151 via the port 150 and act on the piston shoulder 116 to position the lock piston 110 in an unlocked position.

The rotatable portion 133 and biasing means 130 are also shown.

Figure 4A:
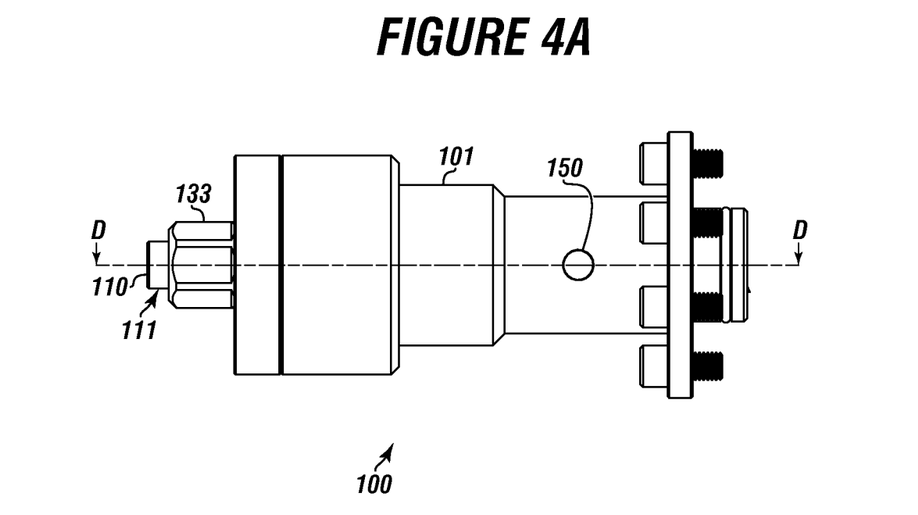
FIG. 4A is a side view of a lock cylinder in a manually unlocked position.

FIG. 4A is a side view of a lock cylinder in a manually unlocked position.

The lock cylinder 100 can include a lock body 101 with a port 150. The rotatable portion 133 is shown. The visible portion 111 of the lock piston 110 is also shown.

Figure 4B:
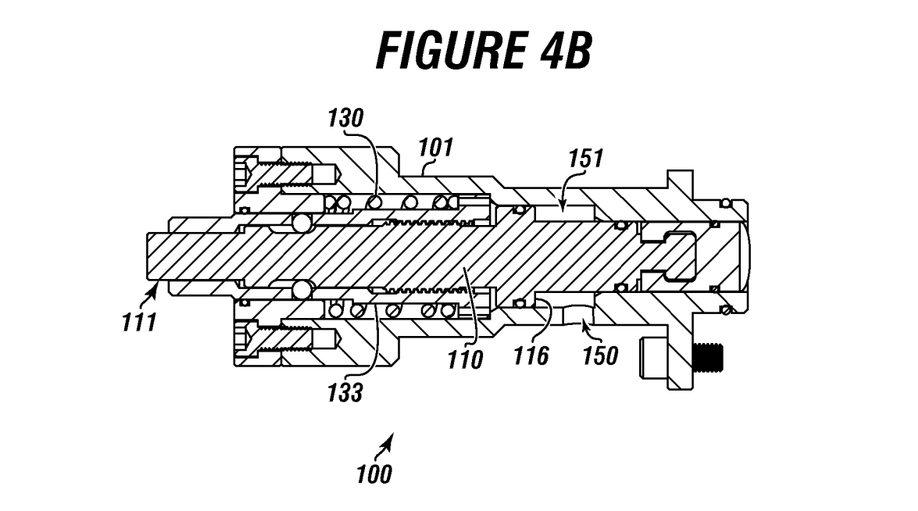
FIG. 4B is a cut view of a lock cylinder in a manually unlocked position.

FIG. 4B is a cut view of a lock cylinder in a manually unlocked position along cut line D-D.

The lock cylinder 100 is shown with the rotatable portion 133. The rotatable portion 133 can be rotated with the positioning thread interacting with the piston thread to extend the visible portion 111 of the lock piston 110 from the lock body 101. The visible portion 111 can provide an indication that the lock piston 110 is not secured in the lock region.

The sealed area 151 can be in communication with the port 150 and the piston shoulder 116. The biasing means 130 is also shown.

Figure 5A:
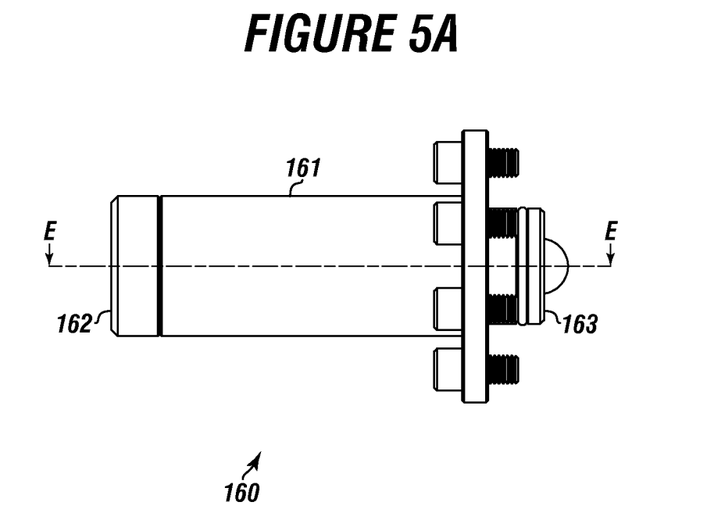
FIG. 5A is a side view of the position indicator indicating an unlocked position.

FIG. 5A is a side view of the position indicator indicating an unlocked position.

The position indicator 160 can include an indicator body 161 with a first end 162 and a second end 163.

Figure 5B:
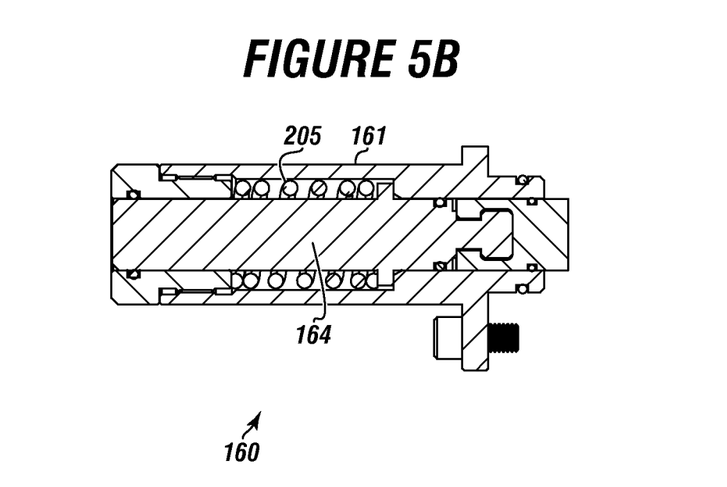
FIG. 5B is a cut view of the position indicator indicating an unlocked position.

FIG. 5B is a cut view of the position indicator indicating an unlocked position along cut line E-E.

The position indicator 160 can include an indicator body 161 and an indicator piston 164. The position indicator 160 can also include a spring 205 acting as a bias to position the indicator piston 164 when the system is in an unlocked position.

Figure 6A:
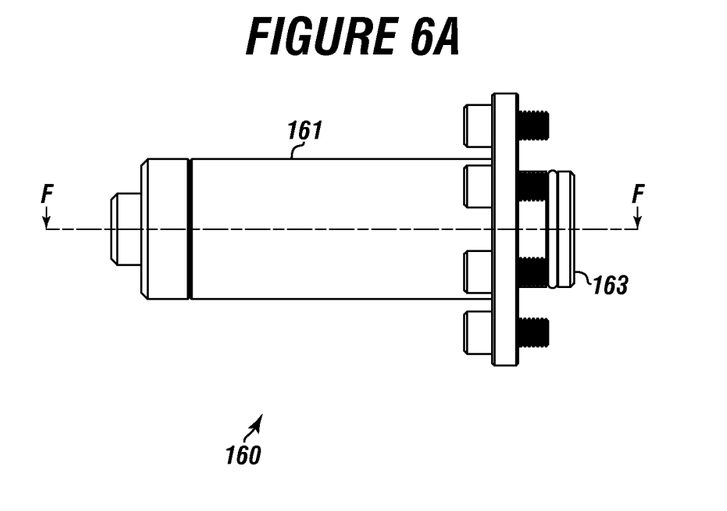
FIG. 6A is a side view of the position indicator indicating a locked position.

FIG. 6A is a side view of the position indicator indicating a locked position.

The position indicator 160 is shown with an indicator body 161 with a second end 163.

Figure 6B:
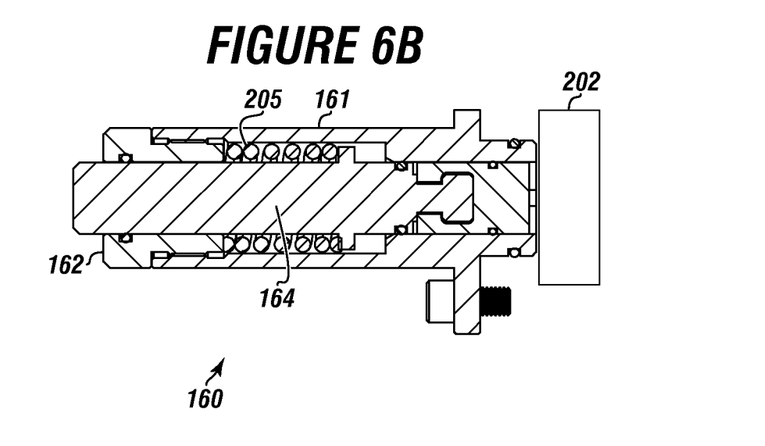
FIG. 6B is a cut view of the position indicator indicating a locked position.

FIG. 6B is a cut view of the position indicator indicating a locked position along cut line F-F.

The position indicator 160 can include an indicator piston 164. The second mechanical feature 202 can cause the indicator piston 164 to compress the spring 205 and extend from the first end 162 of the indicator body 161 to indicate that the system is in a locked position.

Figure 7:
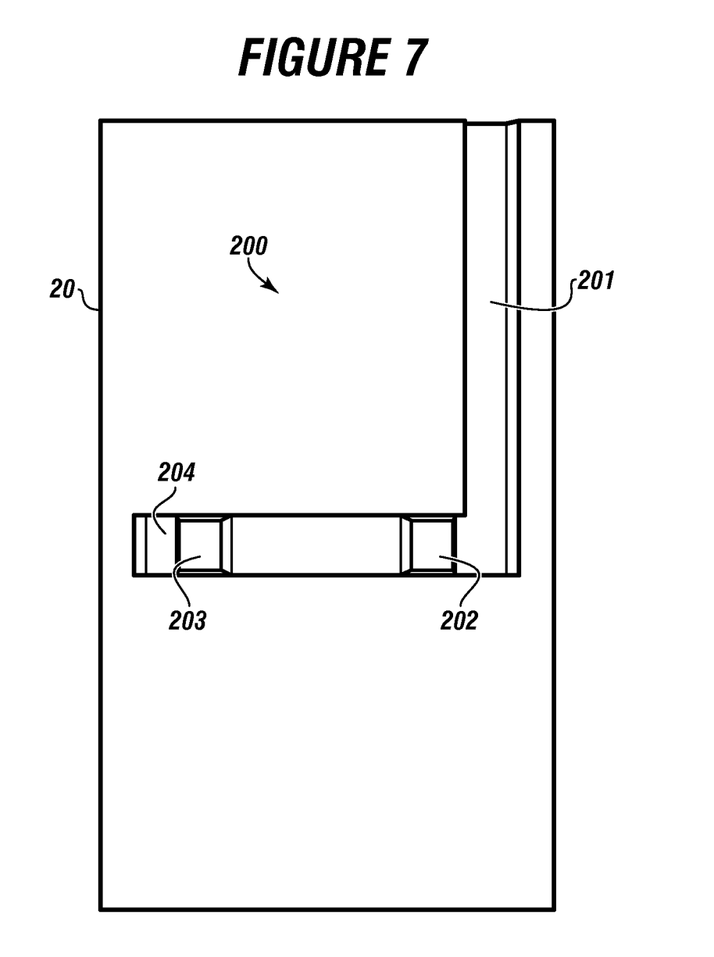
FIG. 7 depicts the channel of the second cylindrical component.

FIG. 7 depicts the channel of the second cylindrical component.

The second cylindrical component 20 can include a channel 200. The channel 200 can comprise a guide region 201 for slidably receiving and engaging at least part of the locking portion and mechanically cooperates with at least part of the locking portion to properly align, orient or guide the first cylindrical component with respect to the second cylindrical component.

The channel 200 can comprise a lock region 204 contiguous with the guide region 201 to secure the lock piston. The lock region 204 can comprise a first mechanical feature 203 disposed proximate the guide region 201. The first mechanical feature 203 can prevent the lock piston from travelling into the guide region and can hold the locking portion of the lock piston substantially immobile with the first cylindrical component and second cylindrical component are locked.

In embodiments, a second mechanical feature 202 can be disposed within the channel 200. The second mechanical feature can overcome the bias of the indicator piston 164 when aligned with the indicator piston, causing the indicator piston to visibly extend out of the first end.

While these embodiments have been described with emphasis on the specific embodiments, it should be understood that within the scope of the appended claims, the embodiments might be practiced other than as specifically described herein.

What is claimed is:

1. A system for verifiably locking a first cylindrical component to a second cylindrical component, wherein the system provides a visible indication when the first cylindrical component and the second cylindrical component are secured, the system comprising:
   a. the first cylindrical component comprising a lock cylinder fixedly attached to the first cylindrical component, wherein the lock cylinder comprises:
      (i) a lock body;
      (ii) a lock piston disposed within the lock body, wherein the lock piston is moveable and comprises:
         1. a visible portion;
         2. a locking portion opposite the visible portion; and
         wherein the visible portion, the locking portion, or the visible portion and the locking portion are selectively extended at least partially out of the lock body; and
      (iii) a means of positioning the lock piston to selectively extend out of the lock body; and
   b. the second cylindrical component comprising a channel, wherein the channel comprises:
      (i) a guide region which slidably receives and engages at least part of the locking portion and mechanically cooperates with at least part of the locking portion to properly align, properly orient, or properly guide the first cylindrical component with respect to the second cylindrical component; and
      (ii) a lock region contiguous with the guide region to secure the lock piston, wherein the lock region comprises a first mechanical feature disposed proximate the guide region to prevent the lock piston from travelling into the guide region and holding the locking portion of the lock piston substantially immobile when the first cylindrical component and the second cylindrical component are locked; and
   wherein the visible portion of the lock piston provides an indication of whether or not the lock piston is secured in the lock region of the channel;
   c. a position indicator fixedly attached to the first cylindrical component, wherein the position indicator comprises:
      (i) an indicator body with a first end and a second end; and
      (ii) a moveable indicator piston extending at least partially out of the indicator body, wherein the indicator piston is biased to extend out of the second end;
   d. a second mechanical feature disposed within the channel, wherein the second mechanical feature overcomes the bias of the indicator piston when aligned with the indicator piston, causing the indicator piston to visibly extend out of the first end; and
   wherein the lock piston does not extend visibly from the lock body and, simultaneously, the indicator piston extends visibly out of the indicator body when the locking portion of the lock piston is secured in the locking region.

2. The system of claim 1, wherein the indication comprises the visible portion of the lock piston extending from the lock body when the lock piston is not secured in the lock region of the channel.

3. The system of claim 1, wherein the lock body further comprises a sealing means to prevent entry of foreign objects, debris, liquids, moisture, or combinations thereof.

4. The system of claim 3 wherein the sealing means is capable of withstanding a differential pressure of 5000 pounds per square inch (psi).

5. The system of claim 1, wherein the lock body further comprises at least one port to receive a fluid.

6. The system of claim 1, wherein the lock body further comprises a sensor for determining the position of the lock piston.

7. The system of claim 1, wherein the locking portion of the lock piston further comprises an angled face opposite a substantially flat face, wherein the angled face displaces the lock piston as it travels past the first mechanical feature and the substantially flat face cooperates with the first mechanical feature to secure the lock piston in the lock region.

8. The system of claim 1, wherein the means of positioning the lock piston comprises:
   a. an elastic material in mechanical communication with the lock body;
   b. a biasing means;
   c. a fluid added to the lock body;
   d. a fluid drained from the lock body;
   e. a positioning thread disposed within the lock body engaging a piston thread on the lock piston, wherein:
      (i) the lock piston is mechanically rotated; or
      (ii) a portion of the lock body is mechanically rotated; or
   f. combinations thereof.

9. The system of claim 1, wherein the first mechanical feature is a channel step securing the lock piston in place when the locking portion is extended from the lock body, wherein the channel step acts to position and secure the first cylindrical component and the second cylindrical component at a desired orientation, a desired alignment, and a desired placement with respect to each other.

10. The system of claim 9, further comprising:
    a. a piston thread disposed on the lock piston;
    b. a biasing means disposed within the lock body, wherein the biasing means applies force to the lock piston to extend the lock piston at least partially out of the lock body in a first position;
    c. a bias retainer to secure the biasing means; and
    d. a rotatable portion of the lock body comprising a positioning thread, wherein the positioning thread engages the piston thread.

11. The system of claim 9, further comprising:
    a. a piston shoulder disposed on the lock piston;
    b. a port allowing a fluid to flow into the lock body, out of the lock body, or both into and out of the lock body;
    c. a sealed area for containing the fluid, wherein the sealed area is in fluid communication with the port and the sealed area is in fluid communication with the piston shoulder; and
    d. a fluid supply in fluid communication with the port.

12. The system of claim 9, further comprising:
    a. a piston thread disposed on the lock piston;
    b. a biasing means disposed within the lock body, wherein the biasing means applies force to the lock piston to extend the lock piston at least partially out of the lock body in a first position;
    c. a bias retainer to secure the biasing means;
    d. a rotatable portion of the lock body comprising a positioning thread, wherein the positioning thread engages the piston thread;
    e. a piston shoulder disposed on the lock piston;
    f. a port allowing a fluid to flow into the lock body, out of the lock body, or both into and out of the lock body;
    g. a sealed area for containing the fluid, wherein the sealed area is in fluid communication with the port and the sealed area is in fluid communication with the piston shoulder; and
    h. a fluid supply in fluid communication with the port.

13. The system of claim 1, further comprising:
    a. a piston thread disposed on the lock piston;
    b. a biasing means disposed within the lock body, wherein the biasing means applies force to the lock piston to extend the lock piston at least partially out of the lock body in a first position;
    c. a bias retainer to secure the biasing means; and
    d. a rotatable portion of the lock body comprising a positioning thread, wherein the positioning thread engages the piston thread.

14. The system of claim 13, further comprising:
    a. a piston shoulder disposed on the lock piston;
    b. a port allowing a fluid to flow into the lock body, out of the lock body, or both into and out of the lock body;
    c. a sealed area for containing the fluid, wherein the sealed area is in fluid communication with the port and the sealed area is in fluid communication with the piston shoulder; and
    d. a fluid supply in fluid communication with the port.

15. The system of claim 1, further comprising:
    a. a piston shoulder disposed on the lock piston;
    b. a port allowing a fluid to flow into the lock body, out of the lock body, or both into and out of the lock body;
    c. a sealed area for containing the fluid, wherein the sealed area is in fluid communication with the port and the sealed area is in fluid communication with the piston shoulder; and
    d. a fluid supply in fluid communication with the port.

* * * * *